(12) United States Patent
Torisaka et al.

(10) Patent No.: US 9,969,182 B2
(45) Date of Patent: May 15, 2018

(54) IMAGE RECORDING METHOD, AND TREATMENT LIQUID AND LIQUID SET USED THEREIN

(71) Applicant: CANON KABUSHIKI KAISHA, Tokyo (JP)

(72) Inventors: Yoshitaka Torisaka, Tokyo (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/483,149

(22) Filed: Apr. 10, 2017

(65) Prior Publication Data

US 2017/0297347 A1 Oct. 19, 2017

(30) Foreign Application Priority Data

Apr. 19, 2016 (JP) .................................. 2016-083885

(51) Int. Cl.
*B41J 11/00* (2006.01)
*C09D 11/54* (2014.01)
*B41J 2/005* (2006.01)

(52) U.S. Cl.
CPC ......... *B41J 11/0015* (2013.01); *B41J 2/0057* (2013.01); *C09D 11/54* (2013.01)

(58) Field of Classification Search
CPC ...... B41J 2/0057; B41J 11/0015; C09D 11/54
See application file for complete search history.

(56) References Cited

U.S. PATENT DOCUMENTS 6,935,732 B2 8/2005 Takada et al.
7,377,631 B2 5/2008 Takada et al.
(Continued)

FOREIGN PATENT DOCUMENTS

JP 2009-234219 A 10/2009

*Primary Examiner* — Ahn T. N. Vo
(74) *Attorney, Agent, or Firm* — Fitzpatrick, Cella, Harper & Scinto

(57) ABSTRACT

An image recording method including the steps of forming an image by applying an ink to an ink receiving member and applying a treatment liquid containing an ink-viscosity-increasing component to the ink receiving medium so as to overlap with at least a part of a region of the ink receiving medium to which the ink is applied. The treatment liquid contains a surfactant which lowers a surface tension of water to 25 mN/m or less when added into the water in an amount of 0.1% by mass; and an additive containing at least one compound selected from the group consisting of compounds represented by general formulae (1) to (4):

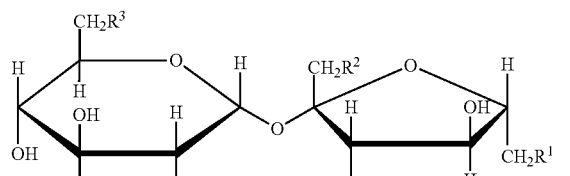

General formula (1)

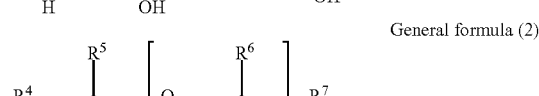

General formula (2)

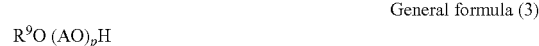

General formula (3)

$R^9O(AO)_pH$

General formula (4)

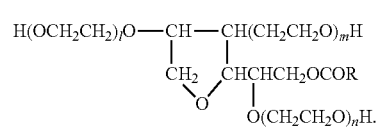

16 Claims, 2 Drawing Sheets

(56) References Cited

U.S. PATENT DOCUMENTS

| | | |
|---|---|---|
| 8,362,108 B2 | 1/2013 | Imai |
| 9,102,137 B2 * | 8/2015 | Koitabashi ............. B41J 2/0057 |
| 9,624,395 B2 | 4/2017 | Kaji et al. |
| 2014/0218424 A1 * | 8/2014 | Koitabashi ................. B41J 1/00 347/1 |
| 2016/0075898 A1 | 3/2016 | Imai et al. |
| 2016/0075899 A1 | 3/2016 | Imai et al. |
| 2016/0129717 A1 * | 5/2016 | Saito .......................... B41J 2/01 347/103 |
| 2016/0200925 A1 | 7/2016 | Kaji et al. |
| 2016/0200929 A1 | 7/2016 | Imai et al. |
| 2016/0230030 A1 | 8/2016 | Tominaga et al. |
| 2016/0340535 A1 | 11/2016 | Torisaka et al. |
| 2016/0355697 A1 | 12/2016 | Tominaga et al. |
| 2016/0368285 A1 | 12/2016 | Shinjo et al. |

* cited by examiner

IMAGE RECORDING METHOD, AND TREATMENT LIQUID AND LIQUID SET USED THEREIN

BACKGROUND OF THE INVENTION

Field of the Invention

The present invention relates an image recording method, and a treatment liquid and a liquid set used therein.

Description of the Related Art

An image recording method using an ink, such as an ink jet recording method has an advantage of being capable of forming an image according to image information without using a plate. In recent years, even such an image recording method has been required to cope with high-speed recording and high image-quality recording.

As an image recording method capable of conducting the high-speed recording and the high image-quality recording, there is known an image recording method with a two-liquid printing system using a first liquid for forming an image and a second liquid for increasing the viscosity of the first liquid. As the first liquid and the second liquid in this two-liquid printing system, an ink containing a coloring material and a treatment liquid (may also referred to as a reaction liquid in some cases) are used respectively.

The second liquid generally contains a component for increasing the viscosity of the ink or causing the aggregation of the coloring material. Japanese Patent Application Laid-Open No. 2009-234219 discloses a treatment liquid containing a surfactant which has such a viscosity property that the viscosity after the preparation thereof increases over time, and so the viscosity when applied to a medium to be applied is higher than the viscosity at the time of preparation. Further, Japanese Patent Application Laid-Open No. 2009-234219 describes the case where the viscosity of the treatment liquid when prepared is low, the operational suitability thereof is thus good, and the viscosity thereof can be controlled to a suitable viscosity when the treatment liquid is applied to the medium to be applied to stably apply the treatment liquid.

SUMMARY OF THE INVENTION

The present invention is intended to provide an image recording method capable of recording an image with less image density unevenness and image blurring even upon image recording at a high speed, and to provide a treatment liquid and a liquid set used in that image recording method.

According to an embodiment of the present invention, there is provided an image recording method including the steps of forming an image by applying an ink to an ink receiving member and applying a treatment liquid containing an ink-viscosity-increasing component to the ink receiving medium so as to overlap with at least a part of a region of the ink receiving medium to which the ink is applied, wherein the treatment liquid contains a surfactant which lowers a surface tension of water to 25 mN/m or less when added into the water in an amount of 0.1% by mass, and an additive containing at least one compound selected from the group consisting of compounds represented by general formulae (1) to (4):

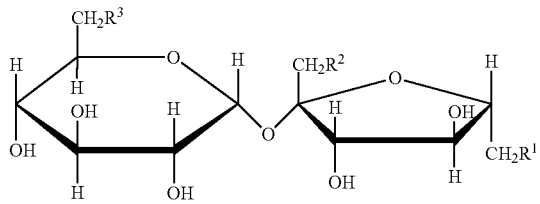

General formula (1)

wherein $R^1$ and $R^2$ are each independently a hydroxy group or a carboxylic acid ester group represented by $-OCOC_xH_{2x+1}$, $R^3$ is a carboxylic acid ester group represented by $-OCOC_yH_{2y+1}$, and x and y are each independently an integer of 11 to 18;

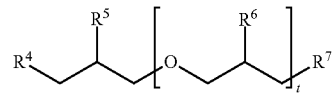

General formula (2)

wherein $R^4$ is a carboxylic acid ester group represented by $-OCOC_rH_{2r+1}$, $R^5$ to $R^7$ are each independently a hydroxy group or a carboxylic acid ester group represented by $-OCOC_zH_{2z+1}$, t is an integer of 4 to 9, and r and z are each independently an integer of 11 to 18;

$$R^9O(AO)_pH \quad \text{General formula (3)}$$

wherein $R^9$ is a straight-chain or branched alkyl group having 11 to 18 carbon atoms, AO is an alkylene oxide group including an ethylene oxide group, p is an integer of 5 to 15, and $(AO)_p$ includes 5 to 15 ethylene oxide groups each of which is the ethylene oxide group; and

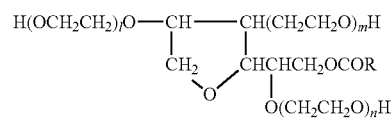

General formula (4)

wherein R is a straight-chain or branched alkyl group having 11 to 18 carbon atoms, and a sum total of l+m+n is an integer of 5 to 15.

According to another embodiment of the present invention, there is provided a treatment liquid including an ink-viscosity-increasing component, a surfactant which lowers a surface tension of water to 25 mN/m or less when added into the water in an amount of 0.1% by mass, and an additive containing at least one compound selected from the group consisting of the compounds represented by the general formulae (1) to (4).

According to a further embodiment of the present invention, there is provided a liquid set for image recording, including an ink and a treatment liquid containing an ink-viscosity-increasing component, wherein the treatment liquid contains a surfactant which lowers a surface tension of water to 25 mN/m or less when added into the water in an amount of 0.1% by mass, and an additive containing at least one compound selected from the group consisting of the compounds represented by the general formulae (1) to (4).

Further features of the present invention will become apparent from the following description of exemplary embodiments with reference to the attached drawings.

DESCRIPTION OF THE EMBODIMENTS

Figure 1A:
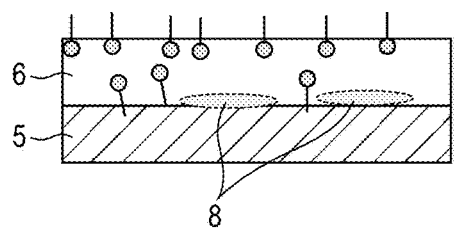
FIGS. 1A and 1B are schematic views for explaining an estimated mechanism of image quality improvement by a treatment liquid according to the present invention.

Preferred embodiments of the present invention will now be described in detail in accordance with the accompanying drawings.

In order to obtain a high-quality image with less image density unevenness and image blurring even upon image recording at a high speed in image recording with a two-liquid printing system, it is an important factor to precisely apply an intended amount of a treatment liquid to a region of an image forming surface of an ink receiving medium to which the treatment liquid should be applied.

However, according to an investigation by the present inventors, the performance of the treatment liquid was unable to be more improved by only such viscosity control of the treatment liquid as described in Japanese Patent Application Laid-Open No. 2009-234219, and so it was unable to be yet said to be sufficient for recording an image with less image density unevenness and image blurring upon image recording at a high speed.

The present inventors have carried out an extensive investigation with a view toward providing an image recording method capable of recording an image with less image density unevenness and image blurring even upon image recording at a high speed, and providing a treatment liquid and a liquid set used in that image recording method, thus leading to completion of the present invention.

The present invention will hereinafter be described in detail by preferred embodiments.

First, the present inventors have carried out an investigation on clarification of the cause of the problem that a high-quality image with less image density unevenness and image blurring has not been unable to be recorded upon image recording at a high speed in image formation on an ink receiving medium with such a treatment liquid capable of controlling the viscosity as described in Japanese Patent Application Laid-Open No. 2009-234219. As a result, the following matters (1) and (2) have been presumed as that cause.

(1) With composition change of the treatment liquid caused by drying upon the application of the treatment liquid, a surfactant added into the treatment liquid for improving coatability on the ink receiving medium is insolubilized. Therefore, the surfactant cannot be sufficiently oriented to gas-liquid and solid-liquid interfaces, and so the coatability on the ink receiving medium has been lowered. It has been presumed that the image density unevenness occurred thereby.

(2) The dispersibility of a coloring material contained in an ink has been improved depending on the composition of the treatment liquid, and consequently the ink-viscosity-increasing function by the treatment liquid has been lowered. It has been presumed that the image blurring occurred thereby.

Thus, the present inventors have investigated the composition of the treatment liquid taking the inhibition of the insolubilization of the surfactant and the inhibition of the lowering of the ink-aggregating effect into consideration, thus leading to the constitution of the present invention.

The image recording method according to the present invention has the following steps (A) and (B):
(A) A step of forming an image by applying an ink to an ink receiving medium.
(B) A step of applying a treatment liquid containing an ink-viscosity-increasing component to the ink receiving medium so as to overlap with at least a part of a region of the ink receiving medium to which the ink is applied.

The image recording method according to the present invention is an image recording method of what is called a two-liquid printing system using a first liquid for forming an image and a second liquid for increasing the viscosity of the ink.

The treatment liquid as the second liquid contains a surfactant which lowers a surface tension of water to 25 mN/m or less when added into the water in an amount of 0.1% by mass, and an additive containing at least one compound selected from the group consisting of compounds represented by the following general formulae (1) to (4):

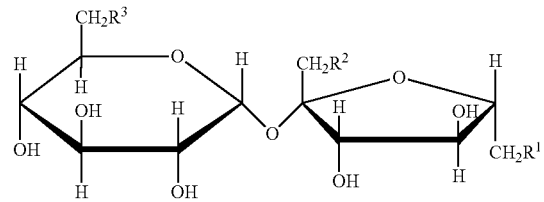

General formula (1)

wherein $R^1$ and $R^2$ are each independently a hydroxy group or a carboxylic acid ester group represented by —$OCOC_xH_{2x+1}$, $R^3$ is a carboxylic acid ester group represented by —$OCOC_yH_{2y+1}$, and x and y are each independently an integer of 11 to 18;

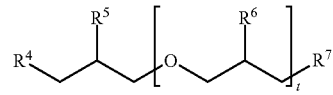

General formula (2)

wherein $R^4$ is a carboxylic acid ester group represented by —$OCOC_rH_{2r+1}$, $R^5$ to $R^7$ are each independently a hydroxy group or a carboxylic acid ester group represented by —$OCOC_zH_{2z+1}$, t is an integer of 4 to 9, and r and z are each independently an integer of 11 to 18.

$$R^9O(AO)_pH$$ General formula (3)

wherein $R^9$ is a straight-chain or branched alkyl group having 11 to 18 carbon atoms, AO is an alkylene oxide group including an ethylene oxide group, p is an integer of 5 to 15, and $(AO)_p$ includes 5 to 15 ethylene oxide groups each of which is the ethylene oxide group; and

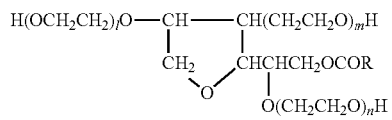

General formula (4)

wherein R is a straight-chain or branched alkyl group having 11 to 18 carbon atoms, and a sum total of 1+m+n is an integer of 5 to 15.

The treatment liquid according to the present invention can be combined with an ink which is the first liquid to constitute a liquid set for image recording. The treatment liquid and liquid set according to the present invention can be provided for use in the image recording method according to the present invention.

Incidentally, details of the action and effect obtained by the combination of the above-described respective components contained in the treatment liquid according to the present invention are not known. However, the present inventors consider that such action and effect are attained by the estimated mechanism illustrated in the schematic views of FIGS. 1A and 1B.

Figure 1B:
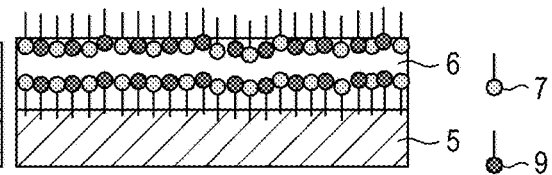

FIG. 1A illustrates the condition of a treatment liquid 6 containing none of the compounds represented by the general formulae (1) to (4) after the treatment liquid 6 is applied on to an ink receiving medium 5. In addition, FIG. 1B illustrates the condition of a treatment liquid 6 containing at least one compound of the compounds represented by the general formulae (1) to (4) as an additive after the treatment liquid 6 is applied on to an ink receiving medium 5.

When the treatment liquid which does not contain the additive 9 is used, insolubilization of a surfactant 7 contained in the treatment liquid 6 is caused by decrease in the amount of a solvent accompanying drying as illustrated in FIG. 1A. The insolubilized surfactant 8 precipitates on a bottom of the layer of the treatment liquid 6, and so the insolubilized surfactant cannot contribute to the intended effect obtained by the addition of the surfactant 7. As a result, the amount of the surfactant 7 which is in a dissolved state and in a state capable of contributing to the intended effect becomes insufficient, and the surface tension of the treatment liquid rises, so that the moderate wettability of the treatment liquid on the surface of the ink receiving medium 5 cannot be attained by these factors. On the contrary, when the compound represented by any one of the general formulae (1) to (4) as the additive 9 is added into the treatment liquid 6, a hydrophilic portion of the surfactant 7 is adsorbed on a hydrophilic portion of the additive 9 by intermolecular force as illustrated in FIG. 1B. Since the additive 9 has sufficient hydrophilicity even when the surfactant 7 is adsorbed thereon, the surfactant 7 can retain a state of having been solubilized by the adsorption on the additive 9. It is thereby considered that the surface tension of the treatment liquid was still low even after the drying upon the application of the treatment liquid, the coatability was improved, and the effect to improve the ink-viscosity-increasing function on the ink receiving medium 5 by the addition of the surfactant 7 was able to be attained.

Incidentally, whether the surfactant is solubilized in the treatment liquid or not was judged according to the following two criteria:

(I) No deposition is observed after the treatment liquid is left to stand for 24 hours after the preparation of the treatment liquid.

(II) After the treatment liquid is applied on to an intermediate transfer member used in Examples described later, an exposed area of the surface of the intermediate transfer member by cissing of the treatment liquid when observed with an optical microscope is less than 10%.

On the inhibition of the occurrence of the image blurring, it is presumed that in the combination of the surfactant and the additive selected this time, these compounds do not have hydrophilicity enough to cause the dispersion of the coloring material on the ink receiving medium.

The effect to improve the coatability and ink-viscosity-increasing function of the treatment liquid can be attained by the action and effect obtained by the above-described estimated mechanism. As a result, it is considered that a high-quality image with less image density unevenness and image blurring was obtained even upon image recording at a high speed.

The respective components used in the preparation of the treatment liquid will hereinafter be described.

Treatment Liquid:

The treatment liquid according to the present invention contains an ink-viscosity-increasing component, a surfactant which lowers a surface tension of water to 25 mN/m or less when added into the water in an amount of 0.1% by mass (hereinafter referred to as "Surfactant A"), and an additive containing at least one compound selected from the group consisting of the compounds represented by the general formulae (1) to (4). The treatment liquid may further contain water, an organic solvent, a pH adjustor and the like.

Ink-Viscosity-Increasing Component

The ink-viscosity-increasing component is a component for increasing the viscosity of the ink. Here, "ink-viscosity-increasing" is a phenomenon including at least one case of the following cases (i) and (ii):

(i) A case where a coloring material, a resin and the like which are parts of a composition constituting the ink chemically react with or physically adsorb on the ink-viscosity-increasing component by coming into contact therewith, whereby the viscosity increase of the whole ink is observed;

(ii) A case where some of the components constituting the ink, such as a coloring material, aggregate, whereby the viscosity increase is locally caused.

As the ink-viscosity-increasing component, an ink-aggregating component which causes the aggregation of the ink is favorable. Incidentally, the aggregation of the ink is a phenomenon caused by aggregation of at least one component of the coloring material and other components contained in the ink, and the components supplied from the treatment liquid.

As examples of the ink-viscosity-increasing component, there may be mentioned metal ions and acids. As examples of the metal ion usable as the ink-viscosity-increasing component, there are mentioned divalent metal ions such as $Ca^{2+}$, $Cu^{2+}$, $Ni^{2+}$, $Mg^{2+}$, $Sr^{2+}$, $Ba^{2+}$ and $Zn^{2+}$, and trivalent metal ions such as $Fe^{3+}$, $Cr^{3+}$, $Y^{3+}$ and $Al^{3+}$, but not limited to these metal ions. When a liquid containing these metal ions is applied, it is desirable to apply it as an aqueous metal salt solution. As examples of a negative ion of the metal salt, there are mentioned $Cl^-$, $NO_3^-$, $CO_3^{2-}$, $SO_4^{2-}$, $I^-$, $Br^-$, $ClO_3^-$, $HCOO^-$ and $R^8COO^-$ ($R^8$ is an alkyl group), but not limited to these negative ions. These metal salts may be used either singly or in any combination thereof. The concentration of the metal salt in the aqueous metal salt solution is favorably 10% by mass or more to 70% by mass or less, more favorably 30% by mass or more to 60% by mass or less.

As Examples of the acid usable as the ink-viscosity-increasing component, there are mentioned inorganic acids such as hydrochloric acid, phosphoric acid, sulfuric acid, nitric acid and boric acid, and organic acids such as oxalic acid, polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid and nicotinic acid. These acids may be used either singly or in any combination thereof.

These acids are favorably used in the form of an acidic solution having a pH of less than 7, for example, an aqueous solution. In addition, a solution containing at least one of derivatives of compounds which are these acids or salts of these acids may be favorably used likewise. The acid concentration of the acidic solution is favorably 10% by mass or more to 70% by mass or less, more favorably 30% by mass or more to 60% by mass or less.

One compound selected from the above-described compounds or a combination of two or more compounds thereof may be used as the ink-viscosity-increasing component. Further, a compound functioning as an ink-aggregating component which causes the aggregation of the ink is favorably selected and used according to the composition of the ink.

Surfactant A

Surfactant A has a function of mainly making the surface tension of the treatment liquid lower than the surface tension of the ink receiving medium, thereby improving the coatability. This function of Surfactant A contributes to the recording of the high-quality image. Incidentally, surfactants usable as Surfactant A, for example, a cationic surfactant and a betaine surfactant, also include those having an ink-viscosity-increasing function such as an ink-aggregating function. The amount of Surfactant A added is favorably 0.5% by mass or more based on the total mass of the treatment liquid from the viewpoint of attaining good coatability. In addition, the amount of Surfactant A added is favorably 9% by mass or less, more favorably 7% by mass or less based on the total mass of the treatment liquid from the viewpoint of reducing the amount of Surfactant A added to efficiently increase the viscosity of the ink by the treatment liquid.

Surfactant A is not limited so long as it lowers the surface tension of water to 25 mN/m or less when added into the water in an amount of 0.1% by mass and does not adversely affect the aggregation of the ink. Further, a surfactant which lowers the surface tension of water to a range of 15 mN/m or more to 25 mN/m or less when added into the water in an amount of 0.1% by mass may be suitably used as Surfactant A.

For example, the following respective surfactants may be used as Surfactant A.

Cationic surfactants such as aliphatic amine salts and quaternary ammonium salts thereof, aromatic quaternary ammonium salts and heterocyclic quaternary ammonium salts; Anionic surfactants such as alkylcarboxylic acid salts, alkyl ether carboxylic acid salts, alkylbenzenesulfonic acid salts, alkylnaphthalenesulfonic acid salts, dialkylsulfo-succinic acid salts, higher alcohol sulfate salts, alkyl ether sulfuric acid salts, alkyl ether phosphate salts and alkyl phosphate salts;
Nonionic surfactants such as ethers such as alkyl and alkylallyl polyoxyethylene ethers, esters such as polyethylene glycol fatty acid esters, and nitrogen-containing compounds such as fatty acid alkanolamides;
Amphoteric surfactants such as carboxybetaines, aminocarboxylic acid salts and imidazoline derivatives; Silicone-based surfactants; and Fluorinated surfactants.

Silicone-based surfactants and fluorinated surfactants are favorable from the viewpoint of coatability.

In addition, the surfactant favorably has an ethylene oxide group —$(CH_2CH_2O)$—. The reason why the surfactant having the ethylene oxide group is favorable seems to be because a plurality of points adsorbing on an additive described later are present at a hydrophilic portion, and so it is adsorbed on the additive to be easily solubilized. Therefore, a silicone-based surfactant or fluorinated surfactant having the ethylene oxide group among the above-described surfactants is particularly favorable.

As specific examples of the silicone-based surfactant having the ethylene oxide group (polyether-modified silicone), there are mentioned BYK347, BYK348 and BYK349 (all, products of BYK Japan KK). As specific examples of the fluorinated surfactant having the ethylene oxide group (perfluoroalkylethylene oxide adduct), there are mentioned Megaface F-444 (product of DIC Corporation), Surflon S-242 and S-243 (both, products of AGC CEIMI CHEMICAL CO., LTD.), and Capstone FS-3100 (product of The Chemours Company, LLC).

One surfactant or a combination of two or more surfactants may be suitably selected from the above-described surfactants and used.

Additive

At least one compound selected from the group consisting of the compounds represented by the general formulae (1) to (4) may be used as the additive.

Incidentally, in the compound represented by the general formula (1), $R^1$ and/or $R^2$ is favorably a hydroxy group. The numerical values of x and y are each 11 or more from the viewpoint of orientation to gas-liquid and solid-liquid interfaces and 18 or less from the viewpoint of sulbilizing Surfactant A.

The content of the compound represented by the general formula (1) is favorably 0.5% by mass or more to 10% by mass or less, more favorably 2.5% by mass or more to 7.5% by mass or less based on the total mass of the treatment liquid.

As specific examples of the compound represented by the general formula (1), there may be mentioned commercially available products such as "RYOTO sugar ester S-1670", "RYOTO sugar ester S-1570", "RYOTO sugar ester S-1170", "RYOTO sugar ester P-1670", "RYOTO sugar ester P-1570", "RYOTO sugar ester M-1695", "RYOTO sugar ester O-1570", "RYOTO sugar ester L-1695" and "RYOTO sugar ester LWA-1570" (all, products of Mitsubishi-Kagaku Foods Corporation).

In the compound represented by the general formula (2), at least one of $R^5$ to $R^7$ is favorably a hydroxy group, and all of $R^5$ to $R^7$ are more favorably hydroxy groups.

The numerical values of r and z are each 11 or more from the viewpoint of orientation to gas-liquid and solid-liquid interfaces and 18 or less from the viewpoint of sulbilizing Surfactant A.

The numerical value of t is 4 or more from the viewpoint of sulbilizing Surfactant A and 9 or less from the viewpoint of orientation to gas-liquid and solid-liquid interfaces.

The content of the compound represented by the general formula (2) is favorably 0.5% by mass or more to 10% by mass or less, more favorably 2.5% by mass or more to 7.5% by mass or less based on the total mass of the treatment liquid.

As specific examples of the compound represented by the general formula (2), there may be mentioned commercially available products such as NIKKOL DECAGLYN 1-L and NIKKOL DECAGLYN 1-LVEX (both, products of Nikko Chemicals Co., Ltd.), MCA-750, ML-500 and ML-750 (all, products of Sakamoto Yakuhin Kogyo Co., Ltd.), and "RYOTO polyglyester S-10D", "RYOTO polyglyester SWA-10D", "RYOTO polyglyester SWA-15D", "RYOTO polyglyester SWA-20D", "RYOTO polyglyester P-8D", "RYOTO polyglyester M-7D", "RYOTO polyglyester M-10D", "RYOTO polyglyester O-15D", "RYOTO polyglyester L-7D" and "RYOTO polyglyester L-10D" (all, products of Mitsubishi-Kagaku Foods Corporation).

Regarding the general formula (3), $(AO)_p$ can be expressed also as $(EO)_m(A'O)_n$, where (EO) represents an ethylene oxide group, and (A'O) represents an alkylene oxide group other than the ethylene oxide group. The alkylene oxide group other than the ethylene oxide group is favorably an alkylene oxide group having 3 or more carbon atoms, more favorably an alkylene oxide group having 3 to 5 carbon atoms. As specific examples of A'O, there may be mentioned propylene oxide, for example. And m is an integer of 5 to 15. $(AO)_p$ has only to include 5 to 15 ethylene oxide groups and may not include an alkylene oxide group other than the ethylene oxide group. Accordingly, n can be 0. To be specific, n is an integer of 0 or more, favorably an integer of 0 to 10. In the compound represented by the general formula (3), the number of carbon atoms of the alkyl group as $R^9$ is 11 or more from the viewpoint of orientation to gas-liquid and solid-liquid interfaces and 18 or less from the viewpoint of sulbilizing Surfactant A.

The numerical value of p is 5 or more from the viewpoint of sulbilizing Surfactant A and 15 or less from the viewpoint of more effectively attaining both the ink-viscosity-increasing effect of the treatment liquid and orientation to gas-liquid and solid-liquid interfaces.

The content of the compound represented by the general formula (3) is favorably 0.5% by mass or more to 10% by mass or less, more favorably 2.5% by mass or more to 7.5% by mass or less based on the total mass of the treatment liquid.

As specific examples of the compound represented by the general formula (3), there may be mentioned commercially available products such as Adeka Tol LB series LB-83, LB-93 and LB-103 (all, products of ADEKA CORPORATION).

In the compound represented by the general formula (4), the number of carbon atoms of the alkyl group as R is 11 or more from the viewpoint of orientation to gas-liquid and solid-liquid interfaces and 18 or less from the viewpoint of sulbilizing Surfactant A.

The numerical value of 1+m+n is 5 or more from the viewpoint of sulbilizing Surfactant A and 15 or less from the viewpoint of more effectively attaining both the ink-viscosity-increasing effect of the treatment liquid and orientation to gas-liquid and solid-liquid interfaces.

The content of the compound represented by the general formula (4) is favorably 0.5% by mass or more to 10% by mass or less, more favorably 2.5% by mass or more to 7.5% by mass or less based on the total mass of the treatment liquid.

As specific examples of the compound represented by the general formula (4), there may be mentioned commercially available products such as RHEODOL TW-S106V and TW-106 (both, products of Kao Corporation).

When two or more compounds among the compounds represented by the general formulae (1) to (4) are contained in the treatment liquid, the total content of the compounds represented by the general formulae (1) to (4) is favorably 2.5% by mass or more to 7.5% by mass or less based on the total mass of the treatment liquid. In addition, the additive favorably contains at least one compound selected from the group consisting of the compounds represented by the general formulae (1) and (2), more favorably contains the compound represented by the general formula (1), the compound represented by the general formula (2) or a mixture of the compound represented by the general formula (1) and the compound represented by the general formula (2).

Water and Organic Solvent

The treatment liquid may contain a proper amount of a liquid medium. As the liquid medium, there may be used one medium selected from water and organic solvents or a mixture of two or more media thereof. In a combination with an aqueous ink, an aqueous liquid medium containing at least water is favorably used as the liquid medium of the treatment liquid.

As examples of the aqueous liquid medium, there are mentioned water and a mixture of water and a water-soluble organic solvent. Specifically, alkanediols such as 1,3-butanediol, 1,5-pentanediol, 1,2-hexanediol and 1,6-hexanediol; glycol ethers such as diethylene glycol monomethyl (or monoethyl) ether and triethylene glycol monoethyl (or monobutyl) ether; alkyl alcohols having 1 to 4 carbon atoms, such as ethanol, isopropanol, n-butanol, isobutanol, sec-butanol and tert-butanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such as tetrahydrofuran and dioxane; glycerol; alkylene glycols such as ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as thiodiglycol, 1,2,6-hexanetriol and acetylene glycol derivatives; nitrogen-containing compounds such as 2-pyrrolidone, N-methyl-2-pyrrolidone and 1,3-dimethyl-2-imidazolidinone; and sulfur-containing compounds such as dimethyl sulfoxide are suitably used. In addition, two or more compounds among them may also be selected and mixed for use.

Other Components

A neutralizer may also be added into the treatment liquid for controlling the hydrogen ion concentration (pH) of the treatment liquid. As specific examples of the neutralizer, there are mentioned potassium hydroxide, calcium hydroxide and sodium hydroxide. These may be used either singly or in any combination thereof. In addition to the above-described components, an antifoaming agent, a preservative, a mildewproofing agent and/or the like may be suitably added into the treatment liquid for giving desired properties to the treatment liquid as needed.

The ink will hereinafter be described.

Ink:

The ink contains a coloring material for forming an image. Further, the ink may also contain a resin particle, an aqueous medium and other components. Materials usable in the ink will hereinafter be described. Incidentally, "(meth) acrylic acid" and "(meth)acrylate" in the following description mean "acrylic acid or methacrylic acid" and "acrylate or methacrylate", respectively.

Coloring Material

The ink may contain at least one of a pigment and a dye as a coloring material. No particular limitation is imposed on the dye and the pigment, and the coloring material may be selected from those usable as the coloring material of the ink to use it in a necessary amount thereof.

The coloring material is favorably a pigment from the viewpoints of weathering resistance and image quality, and at least the pigment is favorably used as the coloring material.

The content of the coloring material in the ink is favorably 0.5% by mass or more to 15.0% by mass or less, more favorably 1.0% by mass or more and 10.0% by mass or less based on the total mass of the ink.

As methods for dispersing the pigment in the ink, there may be mentioned the following methods:
(I) A method of using a resin-dispersed type pigment using a resin as a dispersant (resin-dispersed pigment using a resin dispersant, microcapsule pigment with the surface of a pigment particle covered with a resin, or resin-bonded pigment with an organic group containing a resin chemically bonded to the surface of a pigment particle); and
(II) A method of using a self-dispersible type pigment (self-dispersible pigment) with a hydrophilic group introduced into the surface of a pigment particle.

Needless to say, pigments different in their dispersing methods may also be used in combination. As a specific pigment, carbon black or an organic pigment is favorably used. In addition, one pigment or a combination of two or more pigments may be used. In addition, when the pigment used in the ink is the resin-dispersed type pigment, a resin is used as a dispersant. The resin used as the dispersant favorably has both hydrophilic site and hydrophobic site. As specific examples of the resin, there are mentioned acrylic resins obtained by conducting polymerization with a monomer having a carboxy group, such as acrylic acid or methacrylic acid; and urethane resins obtained by conducting polymerization with a diol having an anionic group, such as dimethylolpropionic acid.

The acid value of the resin used as the dispersant is favorably 50 mg KOH/g or more to 550 mg KOH/g or less.

The weight-average molecular weight (Mw), in terms of polystyrene, of the resin used as the dispersant as determined by GPC is favorably 1,000 or more to 50,000 or less.

The content of the resin dispersant in the ink is favorably 0.1% by mass or more to 10.0% by mass % or less, more favorably 0.2% by mass or more to 4.0% by mass or less based on the total mass of the ink. The content of the resin dispersant is favorably 0.1-fold or more to 3.0-fold or less in terms of mass ratio with respect to the content of the pigment.

Resin Particle

"Resin particle" means a resin which is present dispersively in a solvent in a state of having a particle diameter. The 50% by mass cumulative volume-average particle diameter (D50) of the resin particle is favorably 10 nm or more to 1,000 nm or less. D50 of the resin particle is more favorably 40 nm or more to 500 nm or less, still more favorably 50 nm or more to 500 nm or less. D50 of the resin particle can be measured according to the following method.

A resin particle dispersion is 50 times diluted (based on volume) with pure water to conduct measurement using UPA-EX150 (manufactured by NIKKISO CO., LTD.) under the following measuring conditions: Set Zero=30 seconds, number of measurements=3, measurement time=180 seconds, and refractive index=1.5.

The weight-average molecular weight (Mw) of the resin particle in terms of polystyrene as determined by a gel permeation chromatography (GPC) is favorably 1,000 or more to 2,000,000 or less.

The minimum film-forming temperature of the resin particle is favorably 20° C. or more to 200° C. or less, more favorably 20° C. or more to 100° C. or less. Incidentally, the measurement method of the minimum film-forming temperature of the resin particle in the present invention conforms to "Determination of minimum film-forming temperature" in JIS K 6828-2.

The content (% by mass) of the resin particle in the ink is favorably 1.0% by mass or more based on the total mass of the ink. Further, the content is favorably 3% by mass or more, more favorably 5% by mass or more to 15% by mass or less.

As the resin particle, any resin particle may be used in the ink so long as it satisfies the above-described definition of the resin particle. As a monomer used in the resin particle, any monomer may be used so long as it is a monomer which can be polymerized by an emulsion polymerization process, a suspension polymerization process, a dispersion polymerization process or the like. As examples of the resin particle, there are mentioned acrylic based, vinyl acetate based, ester based, ethylene based, urethane based, synthetic rubber based, vinyl chloride based, vinylidene chloride based and olefin based resin particles depending on the difference of the monomer. Among these, an acrylic resin particle or a urethane resin particle is favorably used.

As examples of a monomer specifically usable for the acrylic resin particle, there are mentioned α,β-unsaturated carboxylic acids such as (meth)acrylic acid, maleic acid, crotonic acid, angelic acid, itaconic acid and fumaric acid, and salts thereof; esterified products of α,β-unsaturated carboxylic acids, such as ethyl (meth)acrylate, methyl (meth)acrylate, butyl (meth)acrylate, methoxyethyl (meth)acrylate, ethoxyethyl (meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxy-tetraethylene glycol (meth)acrylate, methoxypolyethylene glycol (meth)acrylate, cyclohexyl (meth)acrylate, isobornyl (meth)acrylate, N,N-dimethylaminopropyl (meth)acrylate, monobutyl maleate and dimethyl itaconate; alkylamide compounds of α,β-unsaturated carboxylic acids, such as (meth)acrylamide, dimethyl (meth)acrylamide, N,N-dimethylethyl (meth)acrylamide, N,N-dimethylpropyl (meth)acrylamide, isopropyl (meth)acrylamide, diethyl (meth)acrylamide, (meth)acryloylmorpholine, maleic acid monoamide and crotonic acid methylamide; α,β-ethylenically unsaturated compounds having an aryl group, such as styrene, α-methylstyrene, vinyl phenylacetate, benzyl (meth)acrylate and 2-phenoxyethyl (meth)acrylate; and esterified products of polyfunctional alcohols, such as ethylene glycol diacrylate and polypropylene glycol dimethacrylate. The resin particle may be composed of a homopolymer obtained by polymerizing a single monomer or a copolymer obtained by polymerizing two or more monomers. When the resin particle is composed of the copolymer, the copolymer may be either a random copolymer or a block copolymer. In particular, a resin particle obtained by using a hydrophilic monomer and a hydrophobic monomer is favorable. As examples of the hydrophilic monomer, there are mentioned α,β-unsaturated carboxylic acids and salts thereof. As examples of the hydrophobic monomer, there are mentioned esterified products of α,β-unsaturated carboxylic acids and α,β-ethylenically unsaturated compounds having an aryl group. In particular, the above-described anionic resin particle is a polymer of a monomer composition containing at least one monomer selected from the group consisting of esterified products of α,β-unsaturated carboxylic acids and α,β-ethylenically unsaturated compounds having an aryl group.

The urethane resin particle is a resin particle synthesized by reacting a polyisocyanate which is a compound having two or more isocyanate groups and a polyol compound which is a compound having two or more hydroxy groups. Any urethane resin particle obtained by reacting a publicly known polyisocyanate compound and a publicly known polyol compound may be used so long as it satisfy the above-described conditions of the resin particle.

Meanwhile, regarding the structure of the resin particle, there are mentioned a resin particle of a monolayer structure and a resin particle of a multi-layer structure such as a core-shell structure. The resin particle of the multi-layer structure is favorably used. In particular, the resin particle having the core-shell structure is more favorably used. The resin particle has the core-shell structure, whereby a core portion and a shell portion are clearly functionally separated. The resin particle having such a core-shell structure has the advantage of being able to impart more functions to the ink compared with the resin particle of the monolayer structure.

One resin particle selected from the above-described respective resin particles or a mixture of two or more particles thereof may be used as a component of the ink.

Aqueous Medium

As a liquid medium of the ink, water or an aqueous liquid medium including a mixture of water and a water-soluble organic solvent may be used. At least one of a dye and a pigment is added into the aqueous liquid medium, whereby an aqueous ink can be obtained.

The content of the water-soluble organic solvent is favorably 3.0% by mass or more to 50.0% by mass or less based on the total mass of the ink. Any solvents generally used heretofore may be used as the water-soluble organic solvent. As examples thereof, there are mentioned alcohols, glycols, alkylene glycols the alkylene group of which has 2 to 6 carbon atoms, polyethylene glycols, nitrogen-containing compounds and sulfur-containing compounds. These water-soluble organic solvents may be used either singly or in any combination thereof as needed. Deionized water (ion-exchanged water) is favorably used as water. The content of water is favorably 50.0% by mass or more to 95.0% by mass or less based on the total mass of the ink.

Other Components

The ink may also contain a water-soluble organic compound that is solid at ordinary temperature, such as a polyhydric alcohol such as trimethylolpropane or trimethylolethane, urea, or a urea derivative such as ethyleneurea, as needed, in addition to the above-described components. Further, the ink and treatment liquid in the present invention may also contain various additives such as a surfactant, a pH adjustor, a rust preventive, a preservative, a mildewproofing agent, an antioxidant, an anti-reducing agent, an evaporation accelerator, a chelating agent and a resin as needed.

The image recording method according to an embodiment of the present invention will hereinafter be described.

Image Recording Method:

The image recording method according to the present invention may include the following two methods:

(A) An image recording method in which an intermediate image is formed on an intermediate transfer member as an ink receiving medium, and this intermediate image is transferred to a recording medium; and (B) An image recording method in which an image is directly formed on a recording medium as an ink receiving medium.

In the present invention, the method (A) is referred to as a transfer type image recording method, and the method (B) is referred to as a direct drawing type image recording method.

The ink receiving medium in the transfer type image recording method is an intermediate transfer member which temporarily retains an image. The image formed on the intermediate transfer member (intermediate image) is transferred to a recording medium on which a final image is formed, thereby forming the image on the recording medium.

The ink receiving medium in the direct drawing type image recording method is a recording medium for forming the final image, and the image is formed on this recording medium.

The respective image recording methods will hereinafter be described.

Transfer Type Image Recording Method

In the transfer type image recording method, "intermediate transfer member" corresponds to "ink receiving medium". Accordingly, a paper sheet or the like to which an intermediate image is finally transferred is referred to as "recording medium" in the following description.

Figure 2:
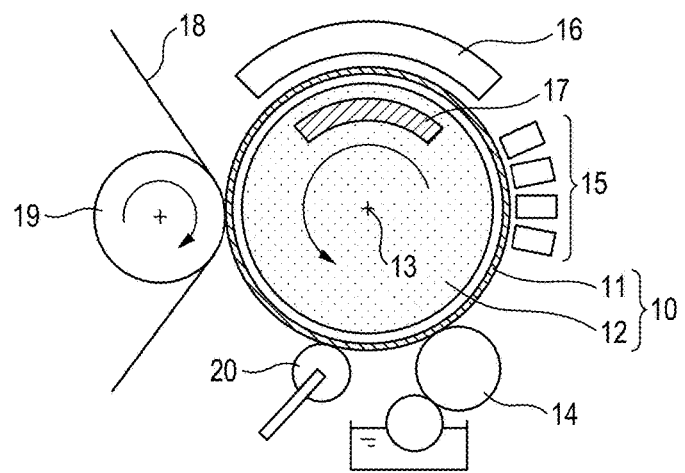
FIG. 2 is a schematic sectional view illustrating an image recording apparatus according to an embodiment of the present invention which can be applied to an image recording method according to the present invention.

FIG. 2 schematically illustrates an image recording apparatus according to an embodiment of the present invention which is used in the transfer type image recording method. In FIG. 2, an intermediate transfer member 10 which is the first recording medium is equipped with a support member 12 of a rotatable drum shape and a surface layer member 11 arranged on an outer peripheral surface of the support member 12. The intermediate transfer member 10 (support member 12) is rotationally driven in the arrow direction (anticlockwise direction in FIG. 2) on a rotational shaft 13. The apparatus is so constructed that respective members arranged around the intermediate transfer member 10 are operated in synchronization with the rotation of the intermediate transfer member 10.

A treatment liquid is applied to the intermediate transfer member 10 by a coating roller 14. The ink is an ink for ink jet recording and applied from a recording head 15 of an ink jet system to form an intermediate image which is a mirror inverted image of a desired image on the intermediate transfer member 10. The temperature of the intermediate image may be controlled by a temperature controlling mechanism 17 so as to be a desired temperature as needed. At this time, a liquid in the intermediate image formed on the intermediate transfer member may also be removed by a liquid removing mechanism 16. A recording medium 18 is then brought into contact with the intermediate transfer member 10 by means of a pressure roller 19, whereby the intermediate image is transferred to the recording medium 18. A cleaning step with a cleaning unit 20 may also be conducted as a step of cleaning the surface of the intermediate transfer member.

The intermediate transfer member and respective steps will hereinafter be described.

Intermediate Transfer Member:

The intermediate transfer member is an ink receiving medium which holds the treatment liquid and the ink to record the intermediate image thereon. As an example of the intermediate transfer member, there is mentioned a member equipped with a support member for handling the intermediate transfer member itself to transmit necessary force and a surface layer member on which the intermediate image is recorded. Incidentally, the support member and the surface layer member may be formed integrally.

As examples of the shape of the intermediate transfer member, there may be mentioned a sheet-shape, a roller-shape, a drum-shape, a belt-shape and an endless web-shape. In addition, the size of the intermediate transfer member may be suitably set according to the size of a recordable recording medium.

The support member of the intermediate transfer member is required to have a certain strength from the viewpoints of the conveyance accuracy and durability thereof. Metal, ceramic or resin is favorable as a material of the support member. Among these, aluminum, iron, stainless steel, acetal resin, epoxy resin, polyimide, polyethylene, polyethylene terephthalate, nylon, polyurethane, silica ceramic or alumina ceramic is favorable. When the support member is formed by such a material, stiffness capable of withstanding a pressure upon transfer and dimensional accuracy can be ensured, and moreover inertia upon operation can be relieved to improve the control responsiveness. Incidentally, these materials may be used either singly or in any combination thereof.

The surface layer of the intermediate transfer member is required to have a certain elasticity because the intermediate image is transferred to the recording medium such as paper. Supposing that, for example, paper is used as the recording medium, the Durometer Type A hardness (conforming to JIS K 6253) of the surface layer of the intermediate transfer member is favorably 10° or more to 100° or less, more favorably 20° or more to 60° or less. Metal, ceramic or resin is favorable as a material of the surface layer member forming the surface layer of the intermediate transfer member. Among these, polybutadiene rubber, nitrile rubber, chloroprene rubber, silicone rubber, fluorine-containing rubber, fluorosilicone rubber, urethane rubber, styrene elastomer, olefin elastomer, vinyl chloride elastomer, ester elastomer, amide elastomer, polyether, polyester, polystyrene, polycarbonate, siloxane compound or perfluorocarbon compound is favorable. In addition, the surface layer member may also be formed by laminating a plurality of materials. As examples thereof, there are mentioned a material obtained by laminating silicone rubber on an endless belt-shaped urethane rubber sheet and a material obtained by forming a film of a siloxane compound on a urethane rubber sheet.

In addition, the contact angle of water on a surface on which an image is formed (image-forming surface) of the intermediate transfer member is favorably 50° or more to 110° or less, more favorably 60° or more to 100° or less.

Further, the surface on which the image is formed (image-forming surface) of the intermediate transfer member is favorably poorly (low) absorbable or nonabsorbable as to the absorbability of liquids such as the treatment liquid and the ink.

Ink Application Step

In an ink application step, the ink is applied to the intermediate transfer member. The application of the ink to the intermediate transfer member is favorably conducted by an ink jet recording method. An ink jet device having a recording head of an ink jet system is favorably used as a unit for applying the ink. In particular, an ink jet device of a system in which thermal energy is caused to act on the ink to eject the ink from an ejection orifice of the recording head is more favorable.

A line head or a serial head may be used as the recording head of the ink jet system. Incidentally, in the ink jet head of the line head form, ink ejection orifices are arranged in a direction perpendicular to a rotational direction of the intermediate transfer member (axial direction in the case where the intermediate transfer member is a drum shape). In addition, the serial head is a head which is scanned in the direction perpendicular to the rotational direction of the intermediate transfer member to conduct recording.

Treatment Liquid Application Step:

In a treatment liquid application step, the treatment liquid is applied to the intermediate transfer member. As examples of a method for applying the treatment liquid to the intermediate transfer member, there are mentioned coating systems such as a roller coating method, a bar coating method and a spray coating method, and an ink jet system. In particular, a coating system is favorably used. The application order of the treatment liquid and the ink to the intermediate transfer member may be suitably selected as needed. However, the treatment liquid application step is favorably provided prior to the ink application step in the transfer type image recording method.

Liquid Removal Step

After an intermediate image is formed by the application of the ink and the treatment liquid, and prior to a transfer step, a liquid removal step of removing a liquid from the intermediate image formed on the intermediate transfer member may also be provided. If an excessive liquid is contained in the intermediate image, the image quality of the resulting image may be lowered in some cases because the excessive liquid overflows in the transfer step. Accordingly, the excessive liquid is favorably removed from the intermediate image by the liquid removal step. As examples of a method for removing the liquid, there are mentioned a heating method, a method of sending low-humidity air, a pressure-reducing method, a naturally drying method and a method of combining these methods.

Transfer Step

In the transfer step, the recording medium is brought into contact with the intermediate image recorded on the intermediate transfer member to transfer the intermediate image to the recording medium from the intermediate transfer member, thereby recording an image on the recording medium. When the intermediate image is transferred to the recording medium, for example, a pressure roller is favorably used to apply a pressure from both sides of the intermediate transfer member and the recording medium. Transfer efficiency can be improved by pressure application. At this time, the pressure may be applied in multiple stages.

With the strong demand for high-speed recording in recent years as described above, it is required to attain high transfer efficiency even at a high transfer speed. Accordingly, in the present invention, the transfer speed means a conveying speed of the recording medium and is favorably 0.6 m/sec or more, more favorably 1.0 m/sec or more, still more favorably 2.0 m/sec or more from the viewpoint of conducting the high-speed recording.

In addition, the intermediate image is favorably heated upon the transfer. As examples of a method for heating the intermediate image, there are mentioned a method of heating the pressure roller to a predetermined transfer temperature in advance and a method of separately providing a heater. The heating temperature of the pressure roller in the transfer step is favorably set according to the resin particle used and is more favorably 25° C. or more to 200° C. or less.

Recording Medium:

The recording medium widely includes not only paper sheets used in general printing, but also fabrics, plastics and films. The recording medium may also be one cut into a desired size in advance. In addition, a rolled sheet may also be used to cut it into a desired size after the image recording.

The absorbability of the recording medium may be classified by the wettability of a recording surface of the recording medium with respect to water. For example, 0.5 µL of a water droplet is dropped on the recording surface of the recording medium to determine a lowering rate of a contact angle (comparison between contact angles at 0.5 milliseconds and 5 seconds after droplet impact on the recording surface). When the lowering rate of the contact angle is less than 1% by mass, such a recording medium is judged as "nonabsorbable recording medium". Incidentally, the contact angle can be measured by means of a portable contact angle meter PCA-1 (manufactured by Kyowa Interface Science Co., Ltd.) or the like.

No particular limitation is imposed on the nonabsorbable recording medium. However, as examples thereof, there are mentioned a plastic film which does not have an ink-absorbing layer and those in which a base material such as paper has a plastic coating thereon or a plastic film bonded thereto. As examples of the plastic referred to herein, there are mentioned polyvinyl chloride, polyethylene terephthalate, polycarbonate, polystyrene, polyurethane, polyethylene, polypropylene and polyacrylic resin.

The conveying speed of the recording medium is favorably 0.6 m/sec or more, more favorably 1.0 m/sec or more, still more favorably 2.0 m/sec or more from the viewpoint of conducting the high-speed recording.

Fixing Step

A fixing step of pressing the recording medium to which the intermediate image has been transferred by a roller may also be provided after the transfer step. The smoothness of the image can be improved by the pressure application.

In addition, when the recording medium to which the intermediate image has been transferred is pressed by the roller, the roller is favorably heated in advance. The fastness properties of the image can be improved by pressing the recording medium by the heated roller. Further, the glossiness of a resulting image may also be controlled by controlling the heating temperature.

Cleaning Step

A cleaning step of cleaning the surface of the intermediate transfer member may also be provided after the transfer step. Any method used heretofore may be used as a method for cleaning the intermediate transfer member. As specific examples thereof, there are mentioned a method of applying a washing liquid in a shower form to the intermediate transfer member, a method of bringing a wetted Molleton roller into contact with the intermediate transfer member to perform wiping, a method of bring the intermediate transfer member into contact with the surface of a cleaning liquid, a method of wiping out residue on the intermediate transfer member by a wiper blade, a method of applying various kinds of energy to the intermediate transfer member, and a method of combining some of these methods.

Direct Drawing Type Image Recording Method:

The direct drawing type image recording method has an ink application step (A) of applying an ink to a recording medium and a treatment liquid application step (B) of applying a treatment liquid to the recording medium so as to overlap with at least a part of a region of the recording medium to which the ink is applied. A fixing step of pressing the recording medium on which the image has been recorded through the steps (A) and (B) by a roller may also be further provided.

In the present invention, the step (B) may be conducted after the step (A), or the step (A) may be conducted after the step (B). In addition, when the same step is conducted twice or more, the order may be any of, for example, step (A)→step (B)→step (A) and step (B)→step (A)→step (B). In particular, a method including a process in which the step (A) is conducted after the step (B) is more favorable because the effect to improve image quality is great.

Figure 3:
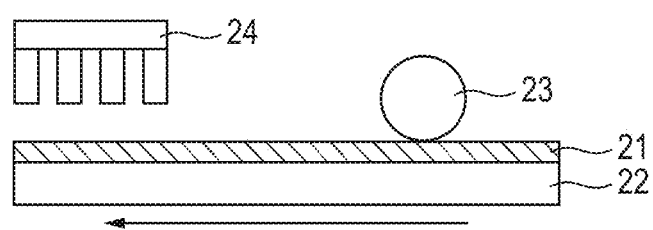
FIG. 3 is a schematic sectional view illustrating an image recording apparatus according to another embodiment of the present invention which can be applied to an image recording method according to the present invention.

FIG. 3 schematically illustrates a direct drawing type image recording apparatus according to an embodiment of the present invention which is used in the direct drawing type image recording method. In FIG. 3, a recording medium 21 is set on a conveyance stage 22 to convey it in the arrow direction. A treatment liquid is applied to the recording medium 21 by a treatment liquid coating device 23 such as a coating roller. An ink is applied from a recording head 24 of an ink jet system to form a desired image.

Ink Application Step

The application of the ink to the recording medium is favorably conducted by an ink jet recording method in which the ink is ejected from a recording head of an ink jet system according to a recording signal to conduct recording on the recording medium. In particular, an ink jet recording method with a system in which thermal energy is caused to act on the ink to eject the ink from an ejection orifice of the recording head is more favorable.

Treatment Liquid Application Step

In the treatment liquid application step, the treatment liquid is applied to the recording medium. As examples of a method for applying the treatment liquid to the recording medium, there are mentioned coating methods such as a roller coating method, a bar coating method and a spray coating method, and an application method by an ink jet system. In particular, a coating system is favorably used.

Fixing Step

In the fixing step, the smoothness of the image can be improved by pressure application. At this time, when the recording medium is pressed by a roller, the roller is favorably heated in advance. The fastness properties of the image can be improved by pressing the recording medium by the heated roller. Further, the glossiness of a resulting image may also be controlled by controlling the heating temperature.

Recording Medium:

The same recording medium as that used in the transfer type image recording method may be used as the recording medium used in the direct drawing type image recording method.

According to the present invention, there can be provided an image recording method capable of recording an image with less image density unevenness and image blurring also upon image recording at a high speed, and a treatment liquid and a liquid set used in that image recording method.

EXAMPLES

The present invention will hereinafter be described more specifically by Examples and Comparative Examples of the treatment liquid for image recording according to the present invention. Needless to say, the present invention is not limited to the following Examples. Incidentally, "part(s)" in the description is based on mass unless expressly noted.

Preparation of Treatment Liquid

Respective treatment liquids used in the present invention were prepared so as to give respective compositions shown in Tables 1-1 and 1-2.

TABLE 1-1

| Treatment liquid No. | Ink-viscosity-increasing component Compound | Amount (% by mass) | Neutralizer Compound | Amount (% by mass) | Surfactant A/ other surfactants Trade name | Amount (% by mass) | Additive of general formulae (1) to (4)/others Trade name/ Compound name | Amount (% by mass) | Water Amount (% by mass) | Surface tension of water upon addition of 0.1% by mass surfactant (mN/m) |
|---|---|---|---|---|---|---|---|---|---|---|
| 1 | Malic acid | 30 | KOH | 5 | FS3100 | 1 | (1)L-1695 | 2.5 | 61.5 | 17.5 |
| 2 | Malic acid | 15 | KOH | 5 | FS3100 | 1 | (1)L-1695 | 2.5 | 76.5 | 17.5 |
| 3 | Malic acid | 50 | KOH | 5 | FS3100 | 1 | (1)L-1695 | 2.5 | 41.5 | 17.5 |
| 4 | Citric acid | 50 | KOH | 5 | FS3100 | 1 | (1)L-1695 | 2.5 | 41.5 | 17.5 |
| 5 | Malonic acid | 50 | KOH | 5 | FS3100 | 1 | (1)L-1695 | 2.5 | 41.5 | 17.5 |
| 6 | Calcium chloride | 50 | KOH | 5 | FS3100 | 1 | (1)L-1695 | 2.5 | 41.5 | 17.5 |
| 7 | Malic acid | 30 | KOH | 5 | FS3100 | 0.5 | (1)L-1695 | 2.5 | 62 | 17.5 |
| 8 | Malic acid | 30 | KOH | 5 | FS3100 | 0.1 | (1)L-1695 | 2.5 | 62.4 | 17.5 |
| 9 | Malic acid | 30 | KOH | 5 | FS3100 | 7 | (1)L-1695 | 2.5 | 55.5 | 17.5 |
| 10 | Malic acid | 30 | KOH | 5 | FS3100 | 9 | (1)L-1695 | 2.5 | 53.5 | 17.5 |
| 11 | Malic acid | 30 | KOH | 5 | FS3100 | 1 | (1)L-1695 | 2.5 | 61.5 | 17.5 |
| 12 | Malic acid | 30 | KOH | 5 | FS3100 | 1 | (1)L-1695 | 1 | 63 | 17.5 |
| 13 | Malic acid | 30 | KOH | 5 | FS3100 | 1 | (1)L-1695 | 7.5 | 56.5 | 17.5 |
| 14 | Malic acid | 30 | KOH | 5 | FS3100 | 1 | (1)L-1695 | 9 | 55 | 17.5 |
| 15 | Malic acid | 30 | KOH | 5 | F410 | 1 | (1)L-1695 | 2.5 | 61.5 | 23.7 |
| 16 | Malic acid | 30 | KOH | 5 | BYK349 | 1 | (1)L-1695 | 2.5 | 61.5 | 22.2 |
| 17 | Malic acid | 30 | KOH | 5 | BYK348 | 1 | (1)L-1695 | 2.5 | 61.5 | 22.4 |
| 18 | Malic acid | 30 | KOH | 5 | BYK347 | 1 | (1)L-1695 | 2.5 | 61.5 | 21.6 |
| 19 | Malic acid | 30 | KOH | 5 | FS3100 | 1 | (2)1-LVEX | 2.5 | 61.5 | 17.5 |
| 20 | Malic acid | 30 | KOH | 5 | FS3100 | 1 | (2)ML-500 | 2.5 | 61.5 | 17.5 |
| 21 | Malic acid | 30 | KOH | 5 | FS3100 | 1 | (3)LB103 | 2.5 | 61.5 | 17.5 |
| 22 | Malic acid | 30 | KOH | 5 | FS3100 | 1 | (4)TW-L106 | 2.5 | 61.5 | 17.5 |
| 23 | Malic acid | 30 | KOH | 5 | — | — | — | — | 65 | — |
| 24 | Malic acid | 30 | KOH | 5 | FS3100 | 1 | — | — | 64 | 17.5 |
| 25 | Malic acid | 15 | KOH | 5 | FS3100 | 1 | — | — | 79 | 17.5 |
| 26 | Malic acid | 50 | KOH | 5 | FS3100 | 1 | — | — | 44 | 17.5 |

TABLE 1-2

| Treatment liquid No. | Ink-viscosity-increasing component Compound | Amount (% by mass) | Neutralizer Compound | Amount (% by mass) | Surfactant A/ other surfactants Trade name | Amount (% by mass) | Additive of general formulae (1) to (4)/others Trade name/ Compound name | Amount (% by mass) | Water Amount (% by mass) | Surface tension of water upon addition of 0.1% by mass surfactant (mN/m) |
|---|---|---|---|---|---|---|---|---|---|---|
| 27 | Citric acid | 50 | KOH | 5 | FS3100 | 1 | — | — | 44 | 17.5 |
| 28 | Malonic acid | 50 | KOH | 5 | FS3100 | 1 | — | — | 44 | 17.5 |
| 29 | Calcium chloride | 50 | KOH | 5 | FS3100 | 1 | — | — | 44 | 17.5 |
| 30 | Malic acid | 30 | KOH | 5 | — | — | (2)1-LVEX | 2.5 | 62.5 | — |
| 31 | Malic acid | 30 | KOH | 5 | F556 | 1 | (1)L-1695 | 2.5 | 61.5 | 29.4 |
| 32 | Malic acid | 30 | KOH | 5 | S420 | 1 | (1)L-1695 | 2.5 | 61.5 | — |
| 33 | Malic acid | 30 | KOH | 5 | BYK333 | 1 | (1)L-1695 | 2.5 | 61.5 | 30.8 |
| 34 | Malic acid | 30 | KOH | 5 | AE40 | 1 | (1)L-1695 | 2.5 | 61.5 | 33.2 |
| 35 | Malic acid | 30 | KOH | 5 | FS3100 | 1 | Glucose lauric monoester | 2.5 | 61.5 | 17.5 |
| 36 | Malic acid | 30 | KOH | 5 | FS3100 | 1 | Sucrose caprylic monoester | 2.5 | 61.5 | 17.5 |
| 37 | Malic acid | 30 | KOH | 5 | FS3100 | 1 | B-370 | 2.5 | 61.5 | 17.5 |
| 38 | Malic acid | 30 | KOH | 5 | FS3100 | 1 | Glycerol lauric monoester | 2.5 | 61.5 | 17.5 |
| 39 | Malic acid | 30 | KOH | 5 | FS3100 | 1 | CE-19D | 2.5 | 61.5 | 17.5 |
| 40 | Malic acid | 30 | KOH | 5 | FS3100 | 1 | B-70D | 2.5 | 61.5 | 17.5 |
| 41 | Malic acid | 30 | KOH | 5 | FS3100 | 1 | BC20 | 2.5 | 61.5 | 17.5 |
| 42 | Malic acid | 30 | KOH | 5 | FS3100 | 1 | TW-L120 | 2.5 | 61.5 | 17.5 |
| 43 | Malic acid | 30 | KOH | 5 | FS3100 | 1 | TEGmM | 2.5 | 61.5 | 17.5 |
| 44 | Malic acid | 30 | KOH | 5 | FS3100 | 1 | Olfine E1010 | 2.5 | 61.5 | 17.5 |

In Tables 1-1 and 1-2, the details of the products shown by trade names and item numbers are as follows:

FS-3100: Capstone FS-3100 (fluorinated surfactant, product of The Chemours Company, LLC);
F-410: Megaface F-410 (fluorinated surfactant, product of DIC Corporation);
F-556: Megaface F-556 (fluorinated surfactant, product of DIC Corporation);
BYK333: Silicone-based surfactant (product of BYK Japan KK);
BYK349: Silicone-based surfactant (product of BYK Japan KK);
BYK348: Silicone-based surfactant (product of BYK Japan KK);
BYK347: Silicone-based surfactant (product of BYK Japan KK);
S-420: Surflon S-420 (fluorinated surfactant, product of AGC CEIMI CHEMICAL CO., LTD.);
AE40: ACETYLENOL E40 (acetylene-glycol-based surfactant, product of Kawaken Fine Chemicals Co., Ltd.);
L-1695: RYOTO sugar ester L-1695 (sucrose lauric acid ester, product of Mitsubishi-Kagaku Foods Corporation);
B-370: RYOTO sugar ester B-370 (sucrose behenic acid ester, product of Mitsubishi-Kagaku Foods Corporation);
CE-19D: RYOTO (trademark) polyglyester CE-19D (decaglycerol caprylic acid ester, product of Mitsubishi-Kagaku Foods Corporation);
B-70D: RYOTO (trademark) polyglyester B-70D (decaglycerol behenic acid ester, product of Mitsubishi-Kagaku Foods Corporation);
1-LVEX: NIKKOL DECAGLYN 1-LVEX (decaglycerol lauric acid monoester, product of Nikko Chemicals Co., Ltd.);
BC20: NIKKOL BC-20 (polyoxyethylene (20) cetyl ether, product of Nikko Chemicals Co., Ltd.);
ML-500: Hexaglycerol lauric acid monoester (product of Sakamoto Yakuhin Kogyo Co., Ltd.);
TW-L106: RHEODOL TW-L106 (polyoxyethylene sorbitan monolaurate 6 E.O., product of Kao Corporation);
TW-L120: RHEODOL TW-L120 (polyoxyethylene sorbitan monolaurate 20 E.O., product of Kao Corporation); and
E1010: Olfine E1010 (acetylene glycol-based surfactant, product of Nissin Chemical Co., Ltd.).

In addition, TEGmM is an abbreviation of triethylene glycol monomethyl ether. Incidentally, since the surfactant S420 used in the treatment liquid 32 is water-insoluble, "–" is written in the column of "Surface tension of water upon addition of 0.1% by mass surfactant" in Table 1-2.

Preparation of Black Pigment Dispersion Liquid

The following respective components were mixed and filled into a batch type vertical sand mill ((manufactured by IMEX Co.).
Pigment [carbon black (trade name "Monarch 1100, product of Cabot Co.)]: 10 parts,
Aqueous resin solution (styrene-ethyl acrylate-acrylic acid terpolymer; acid value: 150 mg KOH/g, weight-average molecular weight: 8,000; an aqueous solution having a solid content of 20% by mass; neutralizer: potassium hydroxide): 15 parts, and
Pure water: 75 parts.

A batch type vertical sand mill was charged with 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a black pigment dispersion liquid having a pigment concentration of about 10% by mass.

Preparation of Cyan Pigment Dispersion Liquid

A cyan pigment dispersion liquid having a pigment concentration of about 10% by mass was obtained in the same manner as in the preparation of the black pigment dispersion liquid except that C.I. Pigment Blue 15:3 was used as the pigment.

Preparation of Resin Particle Dispersion

Eighteen parts of ethyl methacrylate, 2 parts of 2,2'-azobis-(2-methylbutyronitrile) and 2 parts of n-hexadecane were mixed and stirred for 0.5 hours. This mixture was added dropwise into 78 parts of a 6% by mass aqueous solution of a styrene-butyl acrylate-acrylic acid terpolymer (acid value: 130 mg KOH/g, weight-average molecular weight: 7,000), and stirring was conducted for 0.5 hours. The resultant mixture was then irradiated with ultrasonic waves for 3 hours by an ultrasonic wave irradiation machine. A polymerization reaction was then conducted for 4 hours at 80° C. under a nitrogen atmosphere, and filtration was conducted after cooled to room temperature to prepare Resin Particle Dispersion 1 having a resin content of 40.0% by mass. The weight-average molecular weight of the resin particle was 250,000, and the average particle diameter ($D_{50}$) thereof was 200 nm.

Preparation of Ink

Inks having respective compositions shown in the following Table 2 were respectively prepared. Specifically, the inks were prepared by mixing respective components shown in Table 2, sufficiently stirring the resultant mixtures and then filtering the mixtures under pressure through a microfilter (product of Fuji Photo Film Co., Ltd.) having a pore size of 3.0 μm.

TABLE 2

| | Pigment dispersion liquid (% by mass) | Resin Particle Dispersion 1 (% by mass) | Glycerol (% by mass) | Water | AE100 (% by mass) |
|---|---|---|---|---|---|
| Black ink 1 | 40 | 20 | 7 | Balance | 0.5 |
| Cyan ink 1 | 40 | 20 | 7 | Balance | 0.5 |

AE100: ACETYLENOL E100 (acetylene-glycol-based surfactant, product of Kawaken Fine Chemicals Co., Ltd.)

The treatment liquid application methods, ink receiving media, inks and treatment liquids used in the respective Examples and Comparative Examples are shown in the following Tables 3-1 and 3-2, and Tables 4-1 and 4-2.

TABLE 3-1

| Ex./ Comp. Ex. No. | Treatment liquid application method | Ink receiving medium | Ink | Treatment liquid |
|---|---|---|---|---|
| Ex. 1 | Roller coating | Intermediate transfer member | Black ink 1/cyan ink 1 | Treatment liquid 1 |
| Ex. 2 | Head ejection | Intermediate transfer member | Black ink 1/cyan ink 1 | Treatment liquid 2 |
| Ex. 3 | Roller coating | Intermediate transfer member | Black ink 1/cyan ink 1 | Treatment liquid 3 |
| Ex. 4 | Roller coating | Intermediate transfer member | Black ink 1/cyan ink 1 | Treatment liquid 4 |
| Ex. 5 | Roller coating | Intermediate transfer member | Black ink 1/cyan ink 1 | Treatment liquid 5 |

TABLE 3-1-continued

| Ex./Comp. Ex. No. | Treatment liquid application method | Ink receiving medium | Ink | Treatment liquid |
|---|---|---|---|---|
| Ex. 6 | Roller coating | Intermediate transfer member | Black ink 1/cyan ink 1 | Treatment liquid 6 |
| Ex. 7 | Roller coating | Intermediate transfer member | Black ink 1/cyan ink 1 | Treatment liquid 7 |
| Ex. 8 | Roller coating | Intermediate transfer member | Black ink 1/cyan ink 1 | Treatment liquid 8 |
| Ex. 9 | Roller coating | Intermediate transfer member | Black ink 1/cyan ink 1 | Treatment liquid 9 |
| Ex. 10 | Roller coating | Intermediate transfer member | Black ink 1/cyan ink 1 | Treatment liquid 10 |
| Ex. 11 | Roller coating | Intermediate transfer member | Black ink 1/cyan ink 1 | Treatment liquid 11 |
| Ex. 12 | Roller coating | Intermediate transfer member | Black ink 1/cyan ink 1 | Treatment liquid 12 |
| Ex. 13 | Roller coating | Intermediate transfer member | Black ink 1/cyan ink 1 | Treatment liquid 13 |
| Ex. 14 | Roller coating | Intermediate transfer member | Black ink 1/cyan ink 1 | Treatment liquid 14 |
| Ex. 15 | Roller coating | Intermediate transfer member | Black ink 1/cyan ink 1 | Treatment liquid 15 |
| Ex. 16 | Roller coating | Intermediate transfer member | Black ink 1/cyan ink 1 | Treatment liquid 16 |
| Ex. 17 | Roller coating | Intermediate transfer member | Black ink 1/cyan ink 1 | Treatment liquid 17 |
| Ex. 18 | Roller coating | Intermediate transfer member | Black ink 1/cyan ink 1 | Treatment liquid 18 |
| Ex. 19 | Roller coating | Intermediate transfer member | Black ink 1/cyan ink 1 | Treatment liquid 19 |
| Ex. 20 | Roller coating | Intermediate transfer member | Black ink 1/cyan ink 1 | Treatment liquid 20 |
| Ex. 21 | Roller coating | Intermediate transfer member | Black ink 1/cyan ink 1 | Treatment liquid 21 |
| Ex. 22 | Roller coating | Intermediate transfer member | Black ink 1/cyan ink 1 | Treatment liquid 22 |

TABLE 3-2

| Ex./Comp. Ex. No. | Treatment liquid application method | Ink receiving medium | Ink | Treatment liquid |
|---|---|---|---|---|
| Comp. Ex. 1 | Roller coating | Intermediate transfer member | Black ink 1/cyan ink 1 | Treatment liquid 23 |
| Comp. Ex. 2 | Roller coating | Intermediate transfer member | Black ink 1/cyan ink 1 | Treatment liquid 24 |
| Comp. Ex. 3 | Head ejection | Intermediate transfer member | Black ink 1/cyan ink 1 | Treatment liquid 25 |
| Comp. Ex. 4 | Roller coating | Intermediate transfer member | Black ink 1/cyan ink 1 | Treatment liquid 26 |
| Comp. Ex. 5 | Roller coating | Intermediate transfer member | Black ink 1/cyan ink 1 | Treatment liquid 27 |
| Comp. Ex. 6 | Roller coating | Intermediate transfer member | Black ink 1/cyan ink 1 | Treatment liquid 28 |
| Comp. Ex. 7 | Roller coating | Intermediate transfer member | Black ink 1/cyan ink 1 | Treatment liquid 29 |
| Comp. Ex. 8 | Roller coating | Intermediate transfer member | Black ink 1/cyan ink 1 | Treatment liquid 30 |
| Comp. Ex. 9 | Roller coating | Intermediate transfer member | Black ink 1/cyan ink 1 | Treatment liquid 31 |
| Comp. Ex. 10 | Roller coating | Intermediate transfer member | Black ink 1/cyan ink 1 | Treatment liquid 32 |
| Comp. Ex. 11 | Roller coating | Intermediate transfer member | Black ink 1/cyan ink 1 | Treatment liquid 33 |
| Comp. Ex. 12 | Roller coating | Intermediate transfer member | Black ink 1/cyan ink 1 | Treatment liquid 34 |
| Comp. Ex. 13 | Roller coating | Intermediate transfer member | Black ink 1/cyan ink 1 | Treatment liquid 35 |
| Comp. Ex. 14 | Roller coating | Intermediate transfer member | Black ink 1/cyan ink 1 | Treatment liquid 36 |
| Comp. Ex. 15 | Roller coating | Intermediate transfer member | Black ink 1/cyan ink 1 | Treatment liquid 37 |
| Comp. Ex. 16 | Roller coating | Intermediate transfer member | Black ink 1/cyan ink 1 | Treatment liquid 38 |
| Comp. Ex. 17 | Roller coating | Intermediate transfer member | Black ink 1/cyan ink 1 | Treatment liquid 39 |
| Comp. Ex. 18 | Roller coating | Intermediate transfer member | Black ink 1/cyan ink 1 | Treatment liquid 40 |
| Comp. Ex. 19 | Roller coating | Intermediate transfer member | Black ink 1/cyan ink 1 | Treatment liquid 41 |
| Comp. Ex. 20 | Roller coating | Intermediate transfer member | Black ink 1/cyan ink 1 | Treatment liquid 42 |
| Comp. Ex. 21 | Roller coating | Intermediate transfer member | Black ink 1/cyan ink 1 | Treatment liquid 43 |
| Comp. Ex. 22 | Roller coating | Intermediate transfer member | Black ink 1/cyan ink 1 | Treatment liquid 44 |

TABLE 4-1

| Ex./Comp. Ex. No. | Treatment liquid application method | Ink receiving medium | Ink | Treatment liquid |
|---|---|---|---|---|
| Ex. 23 | Roller coating | Polyvinyl chloride | Black ink 1/cyan ink 1 | Treatment liquid 1 |
| Ex. 24 | Head ejection | Polyvinyl chloride | Black ink 1/cyan ink 1 | Treatment liquid 2 |
| Ex. 25 | Roller coating | Polyvinyl chloride | Black ink 1/cyan ink 1 | Treatment liquid 3 |
| Ex. 26 | Roller coating | Polyvinyl chloride | Black ink 1/cyan ink 1 | Treatment liquid 4 |
| Ex. 27 | Roller coating | Polyvinyl chloride | Black ink 1/cyan ink 1 | Treatment liquid 5 |
| Ex. 28 | Roller coating | Polyvinyl chloride | Black ink 1/cyan ink 1 | Treatment liquid 6 |
| Ex. 29 | Roller coating | Polyvinyl chloride | Black ink 1/cyan ink 1 | Treatment liquid 7 |
| Ex. 30 | Roller coating | Polyvinyl chloride | Black ink 1/cyan ink 1 | Treatment liquid 8 |
| Ex. 31 | Roller coating | Polyvinyl chloride | Black ink 1/cyan ink 1 | Treatment liquid 9 |
| Ex. 32 | Roller coating | Polyvinyl chloride | Black ink 1/cyan ink 1 | Treatment liquid 10 |
| Ex. 33 | Roller coating | Polyvinyl chloride | Black ink 1/cyan ink 1 | Treatment liquid 11 |
| Ex. 34 | Roller coating | Polyvinyl chloride | Black ink 1/cyan ink 1 | Treatment liquid 12 |
| Ex. 35 | Roller coating | Polyvinyl chloride | Black ink 1/cyan ink 1 | Treatment liquid 13 |
| Ex. 36 | Roller coating | Polyvinyl chloride | Black ink 1/cyan ink 1 | Treatment liquid 14 |
| Ex. 37 | Roller coating | Polyvinyl chloride | Black ink 1/cyan ink 1 | Treatment liquid 15 |
| Ex. 38 | Roller coating | Polyvinyl chloride | Black ink 1/cyan ink 1 | Treatment liquid 16 |

TABLE 4-1-continued

| Ex./<br>Comp. Ex. No. | Treatment liquid<br>application method | Ink receiving medium | Ink | Treatment liquid |
|---|---|---|---|---|
| Ex. 39 | Roller coating | Polyvinyl chloride | Black ink 1/cyan ink 1 | Treatment liquid 17 |
| Ex. 40 | Roller coating | Polyvinyl chloride | Black ink 1/cyan ink 1 | Treatment liquid 18 |
| Ex. 41 | Roller coating | Polyvinyl chloride | Black ink 1/cyan ink 1 | Treatment liquid 19 |
| Ex. 42 | Roller coating | Polyvinyl chloride | Black ink 1/cyan ink 1 | Treatment liquid 20 |
| Ex. 43 | Roller coating | Polyvinyl chloride | Black ink 1/cyan ink 1 | Treatment liquid 21 |
| Ex. 44 | Roller coating | Polyvinyl chloride | Black ink 1/cyan ink 1 | Treatment liquid 22 |

TABLE 4-2

| Ex./<br>Comp. Ex. No. | Treatment liquid<br>application method | Ink receiving medium | Ink | Treatment liquid |
|---|---|---|---|---|
| Comp. Ex. 23 | Roller coating | Polyvinyl chloride | Black ink 1/cyan ink 1 | Treatment liquid 23 |
| Comp. Ex. 24 | Roller coating | Polyvinyl chloride | Black ink 1/cyan ink 1 | Treatment liquid 24 |
| Comp. Ex. 25 | Head ejection | Polyvinyl chloride | Black ink 1/cyan ink 1 | Treatment liquid 25 |
| Comp. Ex. 26 | Roller coating | Polyvinyl chloride | Black ink 1/cyan ink 1 | Treatment liquid 26 |
| Comp. Ex. 27 | Roller coating | Polyvinyl chloride | Black ink 1/cyan ink 1 | Treatment liquid 27 |
| Comp. Ex. 28 | Roller coating | Polyvinyl chloride | Black ink 1/cyan ink 1 | Treatment liquid 28 |
| Comp. Ex. 29 | Roller coating | Polyvinyl chloride | Black ink 1/cyan ink 1 | Treatment liquid 29 |
| Comp. Ex. 30 | Roller coating | Polyvinyl chloride | Black ink 1/cyan ink 1 | Treatment liquid 30 |
| Comp. Ex. 31 | Roller coating | Polyvinyl chloride | Black ink 1/cyan ink 1 | Treatment liquid 31 |
| Comp. Ex. 32 | Roller coating | Polyvinyl chloride | Black ink 1/cyan ink 1 | Treatment liquid 32 |
| Comp. Ex. 33 | Roller coating | Polyvinyl chloride | Black ink 1/cyan ink 1 | Treatment liquid 33 |
| Comp. Ex. 34 | Roller coating | Polyvinyl chloride | Black ink 1/cyan ink 1 | Treatment liquid 34 |
| Comp. Ex. 35 | Roller coating | Polyvinyl chloride | Black ink 1/cyan ink 1 | Treatment liquid 35 |
| Comp. Ex. 36 | Roller coating | Polyvinyl chloride | Black ink 1/cyan ink 1 | Treatment liquid 36 |
| Comp. Ex. 37 | Roller coating | Polyvinyl chloride | Black ink 1/cyan ink 1 | Treatment liquid 37 |
| Comp. Ex. 38 | Roller coating | Polyvinyl chloride | Black ink 1/cyan ink 1 | Treatment liquid 38 |
| Comp. Ex. 39 | Roller coating | Polyvinyl chloride | Black ink 1/cyan ink 1 | Treatment liquid 39 |
| Comp. Ex. 40 | Roller coating | Polyvinyl chloride | Black ink 1/cyan ink 1 | Treatment liquid 40 |
| Comp. Ex. 41 | Roller coating | Polyvinyl chloride | Black ink 1/cyan ink 1 | Treatment liquid 41 |
| Comp. Ex. 42 | Roller coating | Polyvinyl chloride | Black ink 1/cyan ink 1 | Treatment liquid 42 |
| Comp. Ex. 43 | Roller coating | Polyvinyl chloride | Black ink 1/cyan ink 1 | Treatment liquid 43 |
| Comp. Ex. 44 | Roller coating | Polyvinyl chloride | Black ink 1/cyan ink 1 | Treatment liquid 44 |

Evaluation

An image was recorded according to a method described later to confirm image density unevenness and image blurring, thereby evaluate the image quality of the image.

Incidentally, in the respective image recording apparatus used in the following Examples and Comparative Examples, the conditions where an ink droplet of 3.0 ng (nanograms) is applied to a unit region of $1/1,200$ in.×$1/1,200$ in. at a resolution of 1,200 dpi×1,200 dpi are defined as the recording duty being 100%.

Image Recording Conditions

Upon image recording, the conveying speed of an ink receiving medium was set to 0.6 m/sec to carry out the following respective evaluations.

[1] Examples 1 to 22, and Comparative Examples 1 to 22 (Transfer Type Image Recording Method)

An intermediate transfer member was first provided according to the following method. The intermediate transfer member had a two-layer structure formed by a support member and a surface layer member. In this structure, a flat plate formed of an aluminum alloy was used as the support member of the intermediate transfer member from the viewpoint of required characteristics such as stiffness capable of withstanding a pressure upon transfer and dimensional accuracy. A siloxane compound surface layer using a hydrolyzable organic silicon compound as a raw material was formed as the surface layer member of the intermediate transfer member according to the following method. Glycidoxypropyltriethoxysilane and methyltriethoxysilane were mixed at a molar ratio of 1:1, and reflux under heat was conducted for 24 hours or more in a water solvent by using hydrochloric acid as a catalyst to obtain a hydrolyzable condensate solution. The hydrolyzable condensate solution was diluted to 10 to 20% by mass with methyl isobutyl ketone, and a photocationic polymerization initiator SP150 (product of ADEKA Corporation) was added in an amount of 5% by mass with respect to the solid content to obtain a desired coating solution. The coating solution of the above-described composition was then used to form a film on the support member by spin coating. As a pretreatment of the support member, a plasma treatment was conducted on the surface thereof to improve its coatability and adhesion to the surface layer. The thus-formed film was then irradiated with light from a UV lamp to conduct exposure and heated for 3 hours at 130° C. to obtain a cured product. The film thickness of the surface layer of the cured product at this time was about 0.3 μm.

The above-obtained treatment liquids and inks were installed according to respective combinations shown in Tables 3-1 and 3-2 in the transfer type image recording apparatus (FIG. 2) using the above-obtained intermediate transfer member.

Evaluation of Image Density Unevenness

The transfer type image recording apparatus was used to first apply the treatment liquid obtained above in an application amount of 0.6 g/m² to the intermediate transfer member by means of a coating roller or a recording head of an ink jet system. The cyan ink 1 was then ejected on the intermediate transfer member to which the treatment liquid had been applied from the recording head of the ink jet system to form an image (solid image of 5 cm×5 cm) whose recording duty was 100% on the intermediate transfer member. The density unevenness of the solid image formed on the intermediate transfer member was then observed with an optical microscope.

Evaluation criterion of image density unevenness

AA: Extremely good because no density unevenness was observed;
A: Good because no density unevenness was observed;
B: Within an allowable range although density unevenness was partly observed;
C: Outside an allowable range since density unevenness was observed.

Evaluation of Image Blurring

The transfer type image recording apparatus was used to first apply the treatment liquid obtained above in an application amount of 0.6 g/m² to the intermediate transfer member by means of a coating roller or a recording head of an ink jet system. The cyan ink 1 was then ejected on the intermediate transfer member to which the treatment liquid had been applied from the recording head of the ink jet system to record an image (solid image of 5 cm×5 cm) whose recording duty was 100%. The black ink 1 was further applied to the solid image portion formed with the cyan ink to form an image for evaluation on the intermediate transfer member. Whether blurring was present in the image formed on the intermediate transfer member or not was then observed with an optical microscope. Incidentally, the impact time interval between the respective inks in this example was set to 50 msec.

Evaluation Criterion of Image Blurring

The image quality of the image was evaluated according to the following criterion by observing whether or not blurring was present in a dot later applied on the solid image whose duty was 100% with an optical microscope.

AA: Extremely good because no blurring was observed;
A: Good because no blurring was observed;
B: Within an allowable range although blurring was partly observed;
C: Outside an allowable range since blurring was observed.

[2] Examples 23 to 44 and Comparative Examples 23 to 44 (Direct Drawing Type Image Recording Method)

The direct drawing type image recording apparatus (FIG. 3) was used to first apply the treatment liquid obtained above in an application amount of 0.6 g/m² to LLJET Gloss Enbi Gray Starch EX LLSPEX133 (polyvinyl chloride, product of SAKURAI CO., LTD) which was a recording medium. The cyan ink 1 was then ejected on the recording medium to which the treatment liquid had been applied from a recording head of an ink jet system to form an image (solid image of 5 cm×5 cm) whose recording duty was 100%. The density unevenness of the solid image formed on the recording medium was then observed with an optical microscope.

Evaluation criterion of image density unevenness

AA: Extremely good because no density unevenness was observed;
A: Good because no density unevenness was observed;
B: Within an allowable range although density unevenness was partly observed;
C: Outside an allowable range since density unevenness was observed.

Evaluation of Image Blurring

The direct drawing type image recording apparatus was used to first apply the treatment liquid obtained above in an application amount of 0.6 g/m² to LLJET Gloss Enbi Gray Starch EX LLSPEX133 (polyvinyl chloride, product of SAKURAI CO., LTD) which was a recording medium by means of a coating roller or a recording head of an ink jet system. The cyan ink 1 was then ejected on the recording medium to which the treatment liquid had been applied from the recording head of the ink jet system to form an image (solid image of 5 cm×5 cm) whose recording duty was 100%. The black ink 1 was further applied to the image portion drawn with the cyan ink 1 to form an image for evaluation on the recording medium. Whether blurring was present in the image formed on the recording medium or not was then observed with an optical microscope. Incidentally, the impact time interval between the respective inks in this example was set to 50 msec.

Evaluation Criterion of Image Blurring

The image quality of the image was evaluated according to the following criterion by observing whether or not blurring was present in a dot later applied on the solid image whose duty was 100% with an optical microscope.

AA: Extremely good because no blurring was observed;
A: Good because no blurring was observed;
B: Within an allowable range although blurring was partly observed;
C: Outside an allowable range since blurring was observed.

The results obtained in the respective evaluations are shown in Tables 5-1 and 5-2.

TABLE 5-1

| Ex./Comp. Ex. No. | Image density unevenness | Image blurring |
|---|---|---|
| Example 1 | AA | AA |
| Example 2 | AA | AA |
| Example 3 | AA | AA |
| Example 4 | AA | AA |
| Example 5 | AA | AA |
| Example 6 | AA | AA |
| Example 7 | AA | AA |
| Example 8 | A | AA |
| Example 9 | AA | AA |
| Example 10 | AA | A |
| Example 11 | AA | AA |
| Example 12 | A | AA |
| Example 13 | AA | AA |
| Example 14 | A | AA |
| Example 15 | A | AA |
| Example 16 | A | AA |
| Example 17 | A | AA |
| Example 18 | A | AA |
| Example 19 | A | AA |
| Example 20 | A | AA |
| Example 21 | B | A |
| Example 22 | B | A |
| Comp. Example 1 | C | C |
| Comp. Example 2 | C | C |
| Comp. Example 3 | C | C |
| Comp. Example 4 | C | C |
| Comp. Example 5 | C | C |
| Comp. Example 6 | C | C |
| Comp. Example 7 | C | C |
| Comp. Example 8 | C | C |
| Comp. Example 9 | C | C |
| Comp. Example 10 | C | C |
| Comp. Example 11 | C | C |
| Comp. Example 12 | C | C |
| Comp. Example 13 | C | C |
| Comp. Example 14 | C | C |
| Comp. Example 15 | C | C |
| Comp. Example 16 | C | C |
| Comp. Example 17 | C | C |
| Comp. Example 18 | C | C |

TABLE 5-1-continued

| Ex./Comp. Ex. No. | Image density unevenness | Image blurring |
|---|---|---|
| Comp. Example 19 | B | C |
| Comp. Example 20 | B | C |
| Comp. Example 21 | C | C |
| Comp. Example 22 | C | C |

TABLE 5-2

| Ex./Comp. Ex. No. | Image density unevenness | Image blurring |
|---|---|---|
| Example 23 | AA | AA |
| Example 24 | AA | AA |
| Example 25 | AA | AA |
| Example 26 | AA | AA |
| Example 27 | AA | AA |
| Example 28 | AA | AA |
| Example 29 | AA | AA |
| Example 30 | A | AA |
| Example 31 | AA | AA |
| Example 32 | AA | A |
| Example 33 | AA | AA |
| Example 34 | A | AA |
| Example 35 | AA | AA |
| Example 36 | A | AA |
| Example 37 | A | AA |
| Example 38 | A | AA |
| Example 39 | A | AA |
| Example 40 | A | AA |
| Example 41 | A | AA |
| Example 42 | A | AA |
| Example 43 | B | A |
| Example 44 | B | A |
| Comp. Example 23 | C | C |
| Comp. Example 24 | C | C |
| Comp. Example 25 | C | C |
| Comp. Example 26 | C | C |
| Comp. Example 27 | C | C |
| Comp. Example 28 | C | C |
| Comp. Example 29 | C | C |
| Comp. Example 30 | C | C |
| Comp. Example 31 | C | C |
| Comp. Example 32 | C | C |
| Comp. Example 33 | C | C |
| Comp. Example 34 | C | C |
| Comp. Example 35 | C | C |
| Comp. Example 36 | C | C |
| Comp. Example 37 | C | C |
| Comp. Example 38 | C | C |
| Comp. Example 39 | C | C |
| Comp. Example 40 | C | C |
| Comp. Example 41 | B | C |
| Comp. Example 42 | B | C |
| Comp. Example 43 | C | C |
| Comp. Example 44 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-083885, filed Apr. 19, 2016, which is hereby incorporated by reference herein in its entirety.

What is claimed is:

1. An image recording method comprising the steps of forming an image by applying an ink to an ink receiving medium and applying a treatment liquid containing an ink-viscosity-increasing component to the ink receiving medium so as to overlap with at least a part of a region of the ink receiving medium to which the ink is applied, wherein the treatment liquid contains:
a surfactant which lowers a surface tension of water to 25 mN/m or less when added into the water in an amount of 0.1% by mass; and
an additive containing at least one compound selected from the group consisting of compounds represented by general formulae (1) to (4):

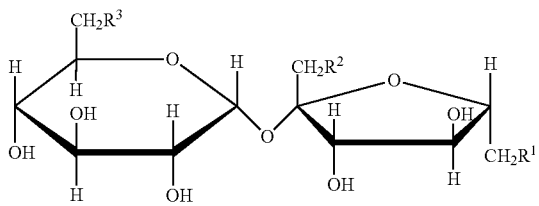

General formula (1)

wherein $R^1$ and $R^2$ are each independently a hydroxy group or a carboxylic acid ester group represented by $-OCOC_xH_{2x+1}$, $R^3$ is a carboxylic acid ester group represented by $-OCOC_yH_{2y+1}$, and x and y are each independently an integer of 11 to 18;

General formula (2)

$$R^4 \sim\sim\sim\underset{R^5}{\phantom{X}}O\left[\underset{R^6}{\phantom{X}}\right]_t R^7$$

wherein $R^4$ is a carboxylic acid ester group represented by $-OCOC_rH_{2r+1}$, $R^5$ to $R^7$ are each independently a hydroxy group or a carboxylic acid ester group represented by $-OCOC_zH_{2z+1}$, t is an integer of 4 to 9, and r and z are each independently an integer of 11 to 18;

$$R^9O(AO)_pH \quad \text{General formula (3)}$$

wherein $R^9$ is a straight-chain or branched alkyl group having 11 to 18 carbon atoms, AO is an alkylene oxide group including an ethylene oxide group, p is an integer of 5 to 15, and $(AO)_p$ includes 5 to 15 ethylene oxide groups each of which is the ethylene oxide group; and General formula (4)

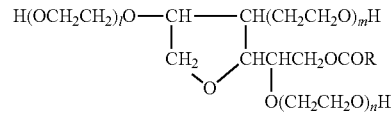

wherein R is a straight-chain or branched alkyl group having 11 to 18 carbon atoms, and a sum total of 1+m+n is an integer of 5 to 15.

2. The image recording method according to claim 1, wherein the surfactant has an ethylene oxide group.

3. The image recording method according to claim 1, wherein the surfactant lowers a surface tension of water to 15 mN/m or more to 25 mN/m or less when added into the water in an amount of 0.1% by mass.

4. The image recording method according to claim 1, wherein the treatment liquid contains the additive in an amount of 0.5% by mass or more to 10% by mass or less based on the total mass of the treatment liquid.

5. The image recording method according to claim 1, wherein the treatment liquid contains the additive in an amount of 2.5% by mass or more to 7.5% by mass or less based on the total mass of the treatment liquid.

6. The image recording method according to claim 1, wherein the treatment liquid contains the surfactant in an amount of 0.5% by mass or more to 7% by mass or less based on the total mass of the treatment liquid.

7. The image recording method according to claim 1, wherein the additive contains at least one compound of the compounds represented by the general formulae (1) and (2).

8. The image recording method according to claim 1, wherein the ink receiving medium is an intermediate transfer member which temporarily retains the image, and wherein the image recording method further comprises a step of transferring the image formed on the intermediate transfer member to a recording medium on which a final image is formed.

9. The image recording method according to claim 1, wherein the ink receiving medium is a recording medium on which a final image is formed, and wherein the image recording method is such that the formation of the image is conducted on the recording medium.

10. The image recording method according to claim 1, wherein in the step of forming the image, the application of the ink to the ink receiving medium is conducted by an ink jet recording method.

11. A treatment liquid comprising:
an ink-viscosity-increasing component;
a surfactant which lowers a surface tension of water to 25 mN/m or less when added into the water in an amount of 0.1% by mass; and
an additive containing at least one compound selected from the group consisting of compounds represented by general formulae (1) to (4):

General formula (1)

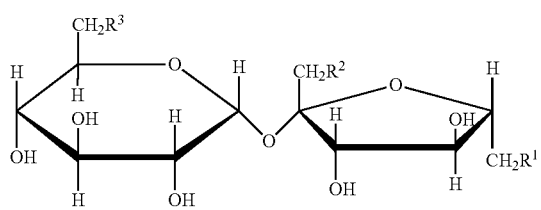

wherein $R^1$ and $R^2$ are each independently a hydroxy group or a carboxylic acid ester group represented by $-OCOC_xH_{2x+1}$, $R^3$ is a carboxylic acid ester group represented by $-OCOC_yH_{2y+1}$, and x and y are each independently an integer of 11 to 18;

General formula (2)

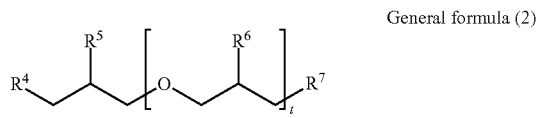

wherein $R^4$ is a carboxylic acid ester group represented by $-OCOC_rH_{2r+1}$, $R^5$ to $R^7$ are each independently a hydroxy group or a carboxylic acid ester group represented by $-OCOC_zH_{2z+1}$, t is an integer of 4 to 9, and r and z are each independently an integer of 11 to 18;

 General formula (3)

wherein $R^9$ is a straight-chain or branched alkyl group having 11 to 18 carbon atoms, AO is an alkylene oxide group including an ethylene oxide group, p is an integer of 5 to 15, and $(AO)_p$ includes 5 to 15 ethylene oxide groups each of which is the ethylene oxide group; and General formula (4)

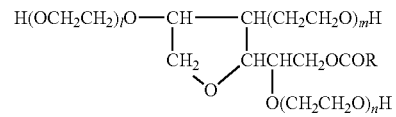

wherein R is a straight-chain or branched alkyl group having 11 to 18 carbon atoms, and a sum total of 1+m+n is an integer of 5 to 15.

12. The treatment liquid according to claim 11, wherein the surfactant lowers a surface tension of water to 15 mN/m or more to 25 mN/m or less when added into the water in an amount of 0.1% by mass.

13. The treatment liquid according to claim 11, for use in the image recording method according to claim 1.

14. A liquid set for image recording, comprising an ink and a treatment liquid containing an ink-viscosity-increasing component,
wherein the treatment liquid contains:
a surfactant which lowers a surface tension of water to 25 mN/m or less when added into the water in an amount of 0.1% by mass; and
an additive containing at least one compound selected from the group consisting of compounds represented by general formulae (1) to (4):

General formula (1)

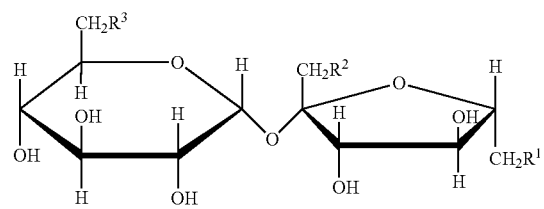

wherein $R^1$ and $R^2$ are each independently a hydroxy group or a carboxylic acid ester group represented by $-OCOC_xH_{2x+1}$, $R^3$ is a carboxylic acid ester group represented by $-OCOC_yH_{2y+1}$, and x and v are each independently an integer of 11 to 18;

General formula (2)

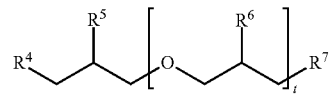

wherein $R^4$ is a carboxylic acid ester group represented by $-OCOC_rH_{2r+1}$, $R^5$ to $R^7$ are each independently a hydroxy group or a carboxylic acid ester group represented by $-OCOC_zH_{2z+1}$, t is an integer of 4 to 9, and r and z are each independently an integer of 11 to 18;

 General formula (3)

wherein $R^9$ is a straight-chain or branched alkyl group having 11 to 18 carbon atoms, AO is an alkylene oxide group including an ethylene oxide group, p is an integer of 5 to 15, and $(AO)_p$ includes 5 to 15 ethylene oxide groups each of which is the ethylene oxide group; and General formula (4)

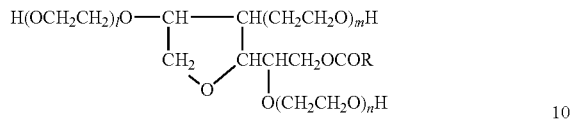

wherein R is a straight-chain or branched alkyl group having 11 to 18 carbon atoms, and a sum total of $l+m+n$ is an integer of 5 to 15.

15. The liquid set according to claim 14, wherein the surfactant lowers a surface tension of water to 15 mN/m or more to 25 mN/m or less when added into the water in an amount of 0.1% by mass.

16. The liquid set according to claim 14, wherein the ink is for use in ink jet recording.

* * * * *